United States Patent [19]

Andersen

[11] Patent Number: 4,558,945
[45] Date of Patent: Dec. 17, 1985

[54] REPRODUCTION CAMERA WITH SYSTEM TO CORRECT EXPOSURE FOR STRAY LIGHT

[75] Inventor: Steen Andersen, Allerod, Denmark
[73] Assignee: Helioprint AS, Kvistgaard, Denmark
[21] Appl. No.: 614,451
[22] Filed: May 25, 1984
[30] Foreign Application Priority Data May 26, 1983 [NL] Netherlands .......................... 8301858

[51] Int. Cl.⁴ .............................................. G03B 27/78
[52] U.S. Cl. ......................................... 355/68; 355/83
[58] Field of Search ...................... 355/83, 115, 68, 35, 355/38, 69, 67; 356/404, 443

[56] References Cited

U.S. PATENT DOCUMENTS

| | | | |
|---|---|---|---|
| 3,611,159 | 10/1971 | Florsheim, Jr. et al. | 355/69 X |
| 3,619,055 | 11/1971 | Archer | 355/69 |
| 3,712,730 | 1/1973 | Florsheim, Jr. et al. | 355/69 |
| 3,796,491 | 3/1974 | McIntosh et al. | 355/69 |
| 4,408,873 | 12/1983 | Labrum | 355/38 X |
| 4,419,008 | 12/1983 | Nishimoto | 355/38 |

FOREIGN PATENT DOCUMENTS 483034 1/1970 Switzerland .
541823 10/1973 Switzerland .
2096336 10/1982 United Kingdom .

OTHER PUBLICATIONS

Search Report issued Feb. 29, 1984, in the Netherlands Appln.
Basic Photography, by Michael J. Langford, p. 243, The Focal Press Limited, London and New York, 1965.

Primary Examiner—L. T. Hix
Assistant Examiner—Della Rutledge
Attorney, Agent, or Firm—Albert C. Johnston; William J. Speranza

[57] ABSTRACT

A reproduction camera for the production of contact screen prints from an original is provided with sensing means, such as a photoelectric cell, for obtaining a measure of the light reflected by the original under conditions of an imagewise main exposure through the contact screen and a signal representing the obtained measure is inputted to a computerized control system through which, by taking into account the effect of stray light caused by reflection from the original during the main exposure, a non-imagewise additional exposure through the contact screen is effected so as to reproduce the minimum and maximum optical densities of the original with the correct dot sizes.

6 Claims, 3 Drawing Figures

REPRODUCTION CAMERA WITH SYSTEM TO CORRECT EXPOSURE FOR STRAY LIGHT

This invention relates to a reproduction camera for the production of contact screen prints from originals.

In screen photography, an original is reproduced on a graphic film through a contact screen in order to convert continuous tones having a specific optical density on the original into screened half-tones having the same optical density on the film. Half-tones on the film are made by means of screen dots of different sizes, and there is a fixed relationship between the screen dot size and the average optical density of the area containing the dots.

Contact screens are used in many versions and may differ, for example, in the optical density gradient in an individual dot and in the maximum optical density of the screen.

Every contact screen has a so-called "basic screen range" which indicates the contrast range of the original that can just be reproduced properly by means of an imagewise exposure through the screen. It is possible to select for each original to be reproduced a contact screen whose basic screen range corresponds to the contrast range of the original. As is apparent, however, a large number of contact screens would be required for operation in this manner, and the procedure would be very time consuming. To overcome these difficulties, it is known to reproduce originals that vary in contrast range by employing for the exposure of each original a contact screen having a certain basic screen range, through which an imagewise main exposure of the light-sensitive material is effected first, and then when appropriate effecting either or both of a non-imagewise additional exposure of the light-sensitive material through the screen and an imagewise additional exposure thereof without the screen—thus compensating for originals whose contrast range is either greater or smaller than the basic range of the screen employed.

In my co-pending U.S. patent application Ser. No. 495,597, filed May 18, 1983 now U.S. Pat. No. 4,488,805 and entitled "Reproduction Camera Control Systems", the disclosure of which is hereby incorporated herein by reference, there is described a reproduction camera for the production of screen prints from an original wherein a computerized control system is provided which receives inputted data, such as minimum and maximum optical densities of the original, optical characteristics of the screen being used and operating characteristics of the optical system, the exposing means and the light-sensitive material, and determines and applies via exposure controlling means the appropriate light dosage for an imagewise main exposure of the original through the screen and the light dosage or dosages for at least one additional imagewise and/or non-imagewise exposure of the light sensitive material, as required for producing a screened print of which the highlight dots and the shadow dots have sizes corresponding to the minimum and maximum optical densities of the original. Upon the inputting of data representing those optical densities, a computer in the control system determines the time for the exposures.

Another, and less apparent factor exists, however,- which needs to be taken into account in such a reproduction camera control system. This factor is the effect of stray light.

Stray light occurs in any optical imaging operation, being caused by reflection and diffusion of light at the lens surfaces and also by reflections at the camera walls. Although dark originals reflect relatively little light, so do not produce a significant amount of stray light, originals which have predominantly light surfaces will reflect a considerable amount of light to the lens and, thus, produce a considerable amount of stray light. In effect, stray light can be regarded as a uniform, non-imagewise additional exposure which the light-sensitive material receives during the imagewise main exposure. As a consequence, when originals to be reproduced differ in reflectivity, the stray light in the camera may make it impracticable to determine the light dosage required for the correct exposures.

The principal object of this invention is to provide a reproduction camera for the production of contact screen prints from various originals, by which the correct exposures for reproducing any of the originals can be assured notwithstanding the effects of stray light on the exposures.

In respect of its basic functional components, the reproduction camera of the present invention corresponds to known reproduction cameras in that it typically comprises a platen for a contact screen and a light-sensitive material, means for holding in imageable relation to the light-sensitive material an original to be reproduced, an optical system for projecting an image of the original onto the light-sensitive material, exposing means operable to effect an imagewise main exposure of the light-sensitive material to light through the contact screen and at least one of a non-imagewise additional exposure thereof to light through the contact screen and an imagewise additional exposure thereof to light without the screen, and means for controlling the light dosage for each exposure. In addition to such components, the reproduction camera also comprises a control system including computer means, for instance substantially as described in the above-mentioned U.S. application Ser. No. 495,597, for determining the light dosage for the various exposures.

In accordance with the present invention, the reproduction camera further comprises sensing means for obtaining a measure of the light reflected by the original under conditions of the imagewise main exposure and producing a reflection signal representing the amount of such light, and the computer means of the control system receives this reflection signal and comprises means for converting it into a correcting signal which is employed to influence a non-imagewise additional exposure of the light-sensitive material through the contact screen. Preferably, the correcting signal is used to determine the time of exposure of the light-sensitive material in a non-imagewise additional exposure thereof through the screen which is effected after the imagewise main exposure through the screen.

Other objects, features and advantages of the invention will be apparent from the following description in which reference is made to the accompanying drawings. In the drawings.

Figure 1:
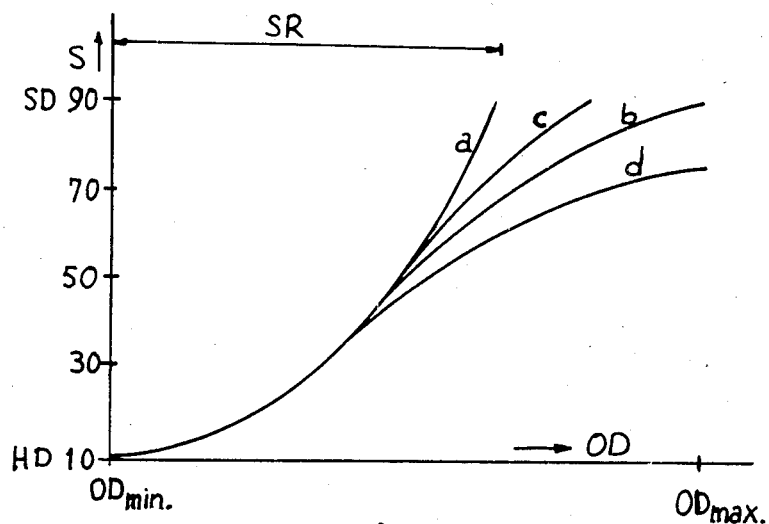
FIG. 1 is a graph representing relationships of optical density and required dot sizes for an original having a contrast range greater than the basic screen range of the contact screen.

In FIG. 1, the optical density (OD) of an original is plotted along the horizontal axis. The lightest part of the original that should just be reproduced is indicated by $OD_{min.}$ and the darkest part that should be reproduced is indicated by $OD_{max.}$. SR is the basic screen range of the contact screen used. The vertical axis indicates the screen dot size (S) as a percentage of the maximum screen dot size.

It generally is desirable when using a positive film to reproduce the $OD_{min.}$ of the original with a screen dot size of about 10%, and to reproduce the $OD_{max.}$ of the original with a screen dot size of about 90%, in relation to the maximum screen dot size. These dot size values are indicated in FIG. 1 by HD (highlight dots) and SD (shadow dots), respectively. An imagewise main exposure through the screen theoretically yields an image having a density gradient as indicated by curve a in FIG. 1. The dark portions of the original are not reproduced distinctly by such an exposure, so in order to reproduce these dark portions distinctly a non-imagewise additional exposure of the light-sensitive material, calculated on the basis of curve a, is effected through the screen as a so-called "flash exposure". Theoretically, as a consequence of this additional exposure the resulting image has a density gradient as indicated by curve b.

When an imagewise main exposure is effected through the screen, however, the original does not in fact yield an image having a density gradient as indicated by curve a. Rather, the original, depending in degree on its reflectivity, yields an image having a density gradient as indicated by curve c, because the stray light produced by reflection from the original has the same effect as would a non-imagewise additional exposure on the density gradient of the resulting image. A non-imagewise additional exposure calculated on the basis of the theoretical curve a will therefore, in reality, yield an image having a density gradient as indicated by curve d. The shadow dots then will have been subjected to excessive exposure, so that the resulting image has inadequate contrast.

The theoretical non-imagewise additional exposure time ($F_o$) required for reproducing a particular original can be calculated by means of the following formula:

$$F_o = F_B \cdot \frac{10^R - 10^{R_o}}{10^R} \quad (1)$$

where $F_B$ is the time of the basic non-imagewise additional exposure, R is the contrast range of the original and $R_o$ is the basic screen range of the screen used.

The exposure time of the main exposure depends on a number of constant factors, such as, for example, imaging ratio, diaphragm opening, light source intensity, and so on. The variable factor in the main exposure is the $OD_{min.}$ of the original, in accordance with the equation:

$$M = T_{H_o} \cdot 10^{OD_{min.}} \quad (2)$$

where M is the main exposure time and $T_{H_o}$ is the basic main exposure time.

If an imagewise additional exposure without a screen also is required, the imagewise additional exposure time $T_B$ can be determined by means of the following formula:

$$T_B = T_{B_o} \cdot 10^{OD_{min.}} \times \left(1 - \frac{10^R - 1}{10^{R_o} - 1}\right) \quad (3)$$

where $T_{B_o}$ is the basic imagewise additional exposure time, $R_o$ is the basic screen range of the contact screen and R is the contrast range of the original. The sum of the main exposure time and the additional exposure timd must remain constant in order to maintain the correct value for HD in relation to $OD_{min.}$ To obtain an accurate non-imagewise additional exposure, the theoretical quantity of additional exposure must be reduced by taking into account the effects of stray light. The corrected non-imagewise additional exposure time $F_c$ according to the invention can be found by reducing the theoretical non-imagewise additional exposure time $F_o$ by a correction factor, in accordance with the following equation:

$$F_c = F_o - f \times M \times I \times C \quad (4)$$

where M is the main exposure time, f is the dispersion factor, I is a measure of the intensity of the light reflected by the original under conditions of the main exposure and C is a constant.

The theoretical non-imagewise additional exposure time $F_o$ and the main exposure time M are found by means of formulae 1 and 2. Since the main exposure time M is a function of $OD_{min.}$ and the theoretical non-imagewise additional exposure time $F_o$ for a given contact screen is a function of the contrast range R of the original, the values for M and $F_o$ can be computed from measurement of the $OD_{min.}$ and $OD_{max.}$ values of the original to be reproduced.

The constant C in formula (4) is an indication of the ratio of the effective light intensity of the additional exposure source to the light intensity of the main exposure source. The dispersion factor f is an empirical constant typical of a specific lens; for a standard lens, for example, f has a value of 0.03. The factor I is a measure of the intensity of the light reflected by the original when the original is subjected to the imagewise main exposure. For a completely white original, $I=1$; while for a dark original, for example, $I=0.01$.

Figure 3:
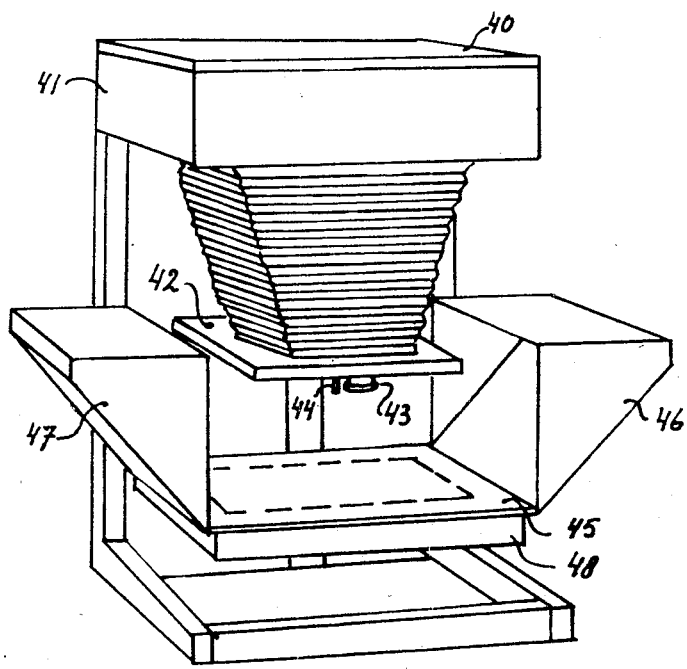
FIG. 3 is a representation of a reproduction camera provided with reflection sensing means.

In FIG. 3 a reproduction camera is shown, which comprises a frame to which an upper body 41 is firmly fixed. A glass plate functioning as an image plane for receiving light-sensitive material is installed in the upper body, and normally is covered by a hinged cover plate 40. The camera also comprises a table 45 for receiving the original to be reproduced, lamp housings, 46, 47 and 48 for exposing the original, and a holder 42 carrying a lens 43 in order to project an image of the original on the light-sensitive material. The intensity I of the light reflected by the original is measured, for example, by reflection sensing means 44 comprising a photoelectric cell secured adjacent lens 43 of the reproduction camera so that the image angle covered by the photoelectric cell is equivalent to the image angle of the lens. As a result of this arrangement, even with variable imaging ratios, the area of the original viewed by the lens will correspond to the area thereof viewed by the photoelectric cell. When an original smaller than the area viewed by the photoelectric cell is to be reproduced, a black margin is provided around the original, as by placing a black border about it or by providing a black platen on the holder for the original in the camera. In this way, the intensity of the reflected light as measured by the photoelectric cell relates substantially only to reflection from the original, so that correction for the light dispersion caused by different originals can be effected accurately.

A reproduction camera of the type here concerned usually comprises a plurality of lenses which can have different image angles and are disposed on a rotatable or slidable lens holder. Such a camera is disclosed, for instance, in U.S. Pat. No. 4,307,940. For a given required imaging ratio, one of the lenses is placed in the path of the rays of light. According to the invention, a photoelectric cell (having an optical system) is disposed adjacent each lens so that each photoelectric cell covers the same image angle as the lens with which it is associated. The lens selection means of the camera, by which a selected one of the lenses is placed in the path of the rays of light, is also provided with means for activating the photoelectric cell associated with that lens. This means can also serve for inputting to the computer of the control system the dispersion factor f as empirically determined for the selected lens.

If the spectral sensitivity of a particular photoelectric cell differs from the spectral sensitivity of the light-sensitive material to be exposed, a spectral filter for the photoelectric cell can be employed in known manner to equalize the sensitivities.

Figure 2:
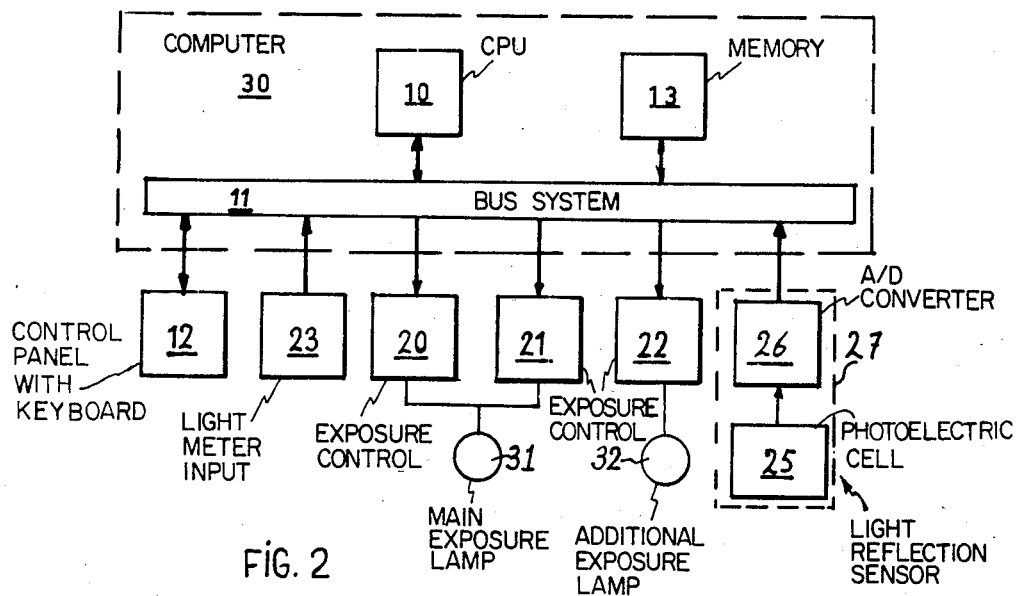
FIG. 2 is a schematic diagram of a computer provided with input and output units.

FIG. 2 schematically represents a computer 30 equipped with input and output means. Computer 30 comprises a central processing unit 10 (CPU), a bus system 11 and a memory 13. A control panel 12 is connected to the central processing unit (CPU) 10 via the bus system 11. A variety of data, such as, for example, imaging ratio, sensitivity of the light-sensitive material, and the basic screen range of the contact screen, are fed to the computer 30 via a keyboard disposed on the control panel 12. Other data, such as, for example, the aperture of the diaphragm or of the lens disposed in the path of the rays of light, are detected by a suitably disposed sensor and also fed to the computer 30.

The data concerning the $OD_{min.}$ and $OD_{max.}$ of the original are automatically fed into the computer 30 by means of a light meter 23 arranged to view the original. If a non-automatic light meter is used, the $OD_{min.}$ and $OD_{max.}$ values can be read from it and fed into the computer via the keyboard on the control panel 12. By means of the formulae (1), (2) and (3) stored in its memory 13, the computer 30 then calculates from the inputted data the main exposure time M, the theoretical non-imagewise additional exposure time $F_o$ and, if required, the additional exposure time $T_B$ for an imagewise additional exposure without a screen.

The central processing unit 10 of computer 30 comprises a control unit, a unit which performs logic operations on binary signals, a so-called ALU (Arithmetic Logic Unit), and various auxiliaries such as registers, clock signal generators, buffers, signal drivers, and so on. The central processing unit 10 draws data and coded instructions from memory 13, decodes them, and then performs the decoded instructions. The signals corresponding to the instructions performed are available on the bus system 11.

During a test exposure of an original by the main exposure lamps without light-sensitive material present to be exposed, a photoelectric cell 25 of reflection sensing means 27 delivers a signal to the A/D converter 26. At the output of this A/D converter, a reflection signal is generated which is proportional to the intensity of the light reflected by the original. This reflection signal is fed to the computer 30.

Using the data of the calculated main exposure time M, the dispersion factor f associated with the lens being used, as obtained from a table in memory 13, and the reflection signal proportional to the intensity I of the light reflected by the original, the computer determines in accordance with formula (4) and stores in memory 13 a correction factor which is proportional to the product of these factors.

Then, to obtain a correcting signal representing a corrected non-imagewise additional exposure time $F_c$ to be used for the original, the theoretical non-imagewise additional exposure time $F_o$ is reduced by the correction factor.

The correcting signal representing the corrected non-imagewise additional exposure time is fed to control means 22 as a combination of binary signals. A binary counter in control means 22 is set by means of these binary signals. During the exposure cycle, clock pulses are fed at a fixed frequency to the counter and a lamp switching relay is actuated for the additional exposure lamp 32.

If the number of clock pulses agrees with the pre-set number in the counter, the counter stops and the lamp switching relay for lamp 32 drops out, resulting in at the correct time in automatic termination of the non-imagewise additional exposure through the screen.

The main exposure lamp 31 is switched on and held active by control means 20 during the main exposure time. When an imagewise additional exposure without the screen is required, the same main exposure lamp 31 is switched on and held active by the control means 21 during the required exposure time.

In accordance with the invention, therefore, means are provided in a reproduction camera for obtaining a measure of the light reflected by the original under conditions of the imagewise main exposure of the original through the screen, and the measured reflection value is then used, along with other appropriate calculated and measured values, to influence the amount of non-imagewise additional exposure through the screen which is required in order to produce accurately, notwithstanding the effect of stray light in the camera, a screened print having dots of specific sizes which correspond substantially completely to the minimum and maximum optical densities of the original.

The invention is not restricted to the particular embodiments described above, as it can be carried out in other ways. For example, a photoelectric cell for measuring the reflectivity of the original can be disposed within the lens itself. Alternatively, the light reflected by the original can be measured by use of a semi-transparent mirror disposed between the lens and the holder for the light-sensitive material so as to reflect to a photoelectric cell the light reflected by the original.

The invention can also be caried out by making use of reflecting sensing means such as a photoelectric cell as a part of control means for the imagewise main exposure. In such an embodiment, an integrator coupled to the photoelectric cell measures the total amount of light reflected during the main exposure and switches off the main exposure when the integrator output signal exceeds a preset value. The integrated light quantity so measured is equivalent to the product of the main exposure time M and the light reflected by the original, so its constitutes a factor of formula (4) that can be fed as a single value into the computer 30.

The correction factor or the corrected non-imagewise additional exposure time can be displayed by a display on the control panel 12.

Another possible alternative is to control the lamp switching relay for the additional exposure lamp 32 directly from the central processing unit 10 of computer 30. The CPU 10 then operates as a time switch for producing an exposure correcting signal, with the time during which the lamp 32 is switched on depending, for example, on the number of times the CPU runs through a given program cycle of known duration. That number of times is related to the calculated corrected non-imagewise additional exposure time and is, therefore, dependent upon the correction factor.

I claim:

1. In a reproduction camera for the production of contact screen prints from originals, including means for holding a contact screen and a light-sensitive material, means for holding in imageable relation to said material an original to be reproduced, an optical system for projecting a light image of the original onto the light-sensitive material, exposing means operable to effect an imagewise main exposure of said material to light through the screen and a non-imagewise additional exposure thereof to light through the screen, and means for controlling the light dosage of exposures;
   computer means for determining and, via said exposure controlling means, applying a light dosage suited for each exposure;
   means for sensing the light reflected by the original under conditions of said imagewise main exposure and producing a reflection signal representing the amount of such light;
   means for inputting said reflection signal to said computer means;
   said computer means including means for converting said reflection signal into an exposure correcting signal; and
   said exposure controlling means including control means responsive to said correcting signal to influence the light dosage in said non-imagewise additional exposure through the screen, thereby taking into account the effect of stray light reflected by the original during an imagewise main exposure.

2. A reproduction camera according to claim 1, said sensing means comprising a photoelectric cell disposed in a location to receive light reflected by the original during an exposure of the original through the screen substantially as in a said imagewise main exposure.

3. A reproduction camera according to claim 1, said optical system comprising at least one lens and said sensing means comprising a photoelectric cell disposed adjacent said lens so that the image angle of said photoelectric cell relative to the original and the image angle of said lens relative thereto are substantially equivalent.

4. A reproduction camera according to claim 1, 2, or 3, said control means being responsive to said correcting signal to influence the exposure time of said non-imagewise additional exposure through the screen.

5. A reproduction camera according to claim 4, said converting means being operative to determine on the basis of said reflection signal and to apply through said control means a correcting signal whereby said exposure time is equivalent to the difference between the non-imagewise additional exposure time theoretically required for correct reproduction of the original and a correction factor proportional to the product of (a) the light dispersion factor of said optical system, (b) the time of said main exposure, and (c) the intensity of the light reflected by the original under conditions of said main exposure.

6. In a reproduction camera for the production of contact screen prints from originals, including means for holding a contact screen and a light-sensitive material, means for holding in imageable relation to said material an original to be exposed, an optical system for projecting a light image of the original onto the light-sensitive material, exposing means operable to effect an imagewise main exposure of said material to light through the screen and one or both of a non-imagewise additional exposure of said material to light through the screen and an imagewise additional exposure thereof to light without the screen, and means for controlling the light dosages of the exposures;
   means for sensing the light reflected by the original under conditions of said imagewise main exposure and producing a reflection signal representing the amount of such light;
   computer means;
   means for inputting to the computer means said reflection signal and data representing the minimum and maximum optical densities of the original to be reproduced, optical characteristics of the screen being used and operating characteristics of said optical system, of said exposing means and of the light sensitive material;
   said computer means being responsive to said data to determine for each said original, and being operable via said exposure controlling means to apply, a light dosage for an imagewise main exposure of said material to light through said screen and, depending on the values of said data, one or more of a light dosage for a non-imagewise additional exposure through said screen and a light dosage for an imagewise additional exposure without said screen;
   said computer means including means for converting said reflection signal into an exposure correcting signal; and
   said exposure controlling means including control means responsive to a said correcting signal to influence the light dosage applied in a said non-imagewise additional exposure through the screen;
   whereby the effect of stray light reflected by the original during the imagewise main exposure is taken into account during a said non-imagewise additional exposure through the screen and a screened print is produced of which the highlight dots and the shadow dots have specific sizes corresponding substantially completely to the minimum and maximum optical densities of the original.

* * * * *